(12) United States Patent
Wang et al.

(10) Patent No.: US 12,433,527 B1
(45) Date of Patent: Oct. 7, 2025

(54) PREDICTING PATIENT RESPONSES TO MULTIPLE MODALITIES OF CNS DISEASE INTERVENTIONS

(71) Applicant: Neumarker Inc., Palo Alto, CA (US)

(72) Inventors: Qing Wang, Palo Alto, CA (US); Qiang Li, Saratoga, CA (US)

(73) Assignee: Neumarker Inc., Palo Alto, CA (US)

( * ) Notice: Subject to any disclaimer, the term of this patent is extended or adjusted under 35 U.S.C. 154(b) by 0 days.

(21) Appl. No.: 18/766,919

(22) Filed: Jul. 9, 2024

Related U.S. Application Data

(60) Provisional application No. 63/575,542, filed on Apr. 5, 2024.

(51) Int. Cl.
*A61B 5/372* (2021.01)
*G16H 50/20* (2018.01)

(52) U.S. Cl.
CPC ............. *A61B 5/372* (2021.01); *G16H 50/20* (2018.01)

(58) Field of Classification Search
CPC ................................ G16H 50/20; A61B 5/372
USPC .......................................................... 706/12
See application file for complete search history.

(56) References Cited

U.S. PATENT DOCUMENTS

| | | | |
|---|---|---|---|
| 9,277,873 B2 | 3/2016 | Sarma et al. | |
| 10,517,540 B1 | 12/2019 | Anderson et al. | |
| 11,771,377 B1 | 10/2023 | Li et al. | |
| 11,980,485 B1 | 5/2024 | Li et al. | |
| 2007/0239056 A1* | 10/2007 | Moore ................... | A61B 5/113 600/407 |
| 2015/0182118 A1 | 7/2015 | Bradbury et al. | |
| 2016/0022193 A1 | 1/2016 | Rau et al. | |

(Continued)

FOREIGN PATENT DOCUMENTS

| | | |
|---|---|---|
| AU | 2021107413 A4 | 1/2022 |
| CN | 115661087 A * | 1/2023 |

(Continued)

OTHER PUBLICATIONS

Budget-Based Classification of Parkinson's Disease From Resting State EEG, by Suuronen et al, IEEE Journal of Biomedical and Health Informatics, vol. 27, No. 8, Aug. 2023 (Year: 2023).*

(Continued)

*Primary Examiner* — Austin Hicks
(74) *Attorney, Agent, or Firm* — MORRISON & FOERSTER LLP

(57) ABSTRACT

An electroencephalography (EEG) system comprises: an EEG device; a display; one or more processors; a memory; and one or more programs, wherein the one or more programs are stored in the memory and configured to be executed by the one or more processors, the one or more programs including instructions for: receiving measurement data; extracting, from the measurement data, a first set of features and a second set of features; inputting the first set of features and the second set of features into a first treatment-specific machine-learning model and a second treatment-specific machine-learning model, respectively; generating a data structure based on the predicted treatment responses; and rendering, on the display, the generated data structure to provide the predicted treatment responses to the first candidate treatment of the CNS disease and the second candidate treatment of the CNS disease.

26 Claims, 7 Drawing Sheets

(56) References Cited

U.S. PATENT DOCUMENTS

| | | | |
|---|---|---|---|
| 2016/0345908 | A1 | 12/2016 | Samzelius |
| 2017/0309022 | A1 | 10/2017 | Silbersweig et al. |
| 2017/0367607 | A1 | 12/2017 | Agarwal et al. |
| 2018/0242919 | A1* | 8/2018 | Doidge .................. G06F 17/14 |
| 2019/0142291 | A1 | 5/2019 | Obeid et al. |
| 2020/0107766 | A1* | 4/2020 | Liu ...................... A61B 5/6814 |
| 2020/0258633 | A1 | 8/2020 | Webb et al. |
| 2020/0311612 | A1* | 10/2020 | Chalkidis ............... G06N 5/022 |
| 2021/0210189 | A1 | 7/2021 | Casey et al. |
| 2022/0047204 | A1 | 2/2022 | Johnsen et al. |
| 2022/0102006 | A1 | 3/2022 | Evangelou et al. |
| 2022/0133194 | A1 | 5/2022 | Bach et al. |
| 2022/0310261 | A1* | 9/2022 | Vodencarevic ........ G16H 50/20 |
| 2022/0313140 | A1 | 10/2022 | Atasoy |
| 2023/0092673 | A1 | 3/2023 | Mitrani |
| 2024/0062847 | A1 | 2/2024 | Murray et al. |
| 2024/0062877 | A1* | 2/2024 | Vohra .................. A61B 5/0022 |
| 2024/0312583 | A1* | 9/2024 | Amarasingham ...... G16H 15/00 |

FOREIGN PATENT DOCUMENTS

| | | |
|---|---|---|
| WO | 2009/103156 A1 | 8/2009 |
| WO | 2010/032929 A2 | 3/2010 |
| WO | 2020/081609 A1 | 4/2020 |
| WO | 2021/075548 A1 | 4/2021 |

OTHER PUBLICATIONS

Ai-Hadeethi, H. et al. (Feb. 3, 2022). "An Eigenvalues-Based Covariance Matrix Bootstrap Model Integrated With Support Vector Machines for Multichannel EEG Signals Analysis," Frontiers in Neuroinformatics 15(808339):1-15.

Chai, R. et al. (2016). "Classification of EEG based-Mental Fatigue using Principal Component Analysis and Bayesian Neural Network," Annu Int Conf IEEE Eng Med Biol Soc: 4654-4657.

Clark, R.A. et al. (Jul. 11, 2022). "Robust Assessment of EEG Connectivity Patterns in Mild Cognitive Impairment and Alzheimer's Disease," Front. Neuroimaging 1(924811):1-14.

Cohen, M.X. (Jan. 24, 2017). "Multivariate Cross-Frequency Coupling Via Generalized Eigendecomposition," Elife 6(e21792):1-26.

Cohen, M.X. (Jan. 28, 2022). "A Tutorial On Generalized Eigendecomposition For Denoising, Contrast Enhancement, And Dimension Reduction In Multichannel Electrophysiology," arXiv:1-48.

Liu, H. et al. (Oct. 1, 2021). "Review on Emotion Recognition Based on Electroencephalography," Front. Comput. Neurosci. 15(758212):1-15.

Shan, X. et al. (Dec. 1, 2022). "Spatial-Temporal Graph Convolutional Network For Alzheimer Classification Based On Brain Functional Connectivity Imaging Of Electroencephalogram," Hum Brain Mapp. 43(17):5194-5209.

Xia, L. et al. (2018). "A Physiological Signal-Based Method For Early Mental-Stress Detection," Biomedical Signal Processing and Control 46:18-32.

Zhao, S. et al. (Feb. 4, 2022). "Temporal and Spatial Dynamics of EEG Features in Female College Students with Subclinical Depression," Int. J. Environ. Res. Public Health 19(1778):1-17.

Carter, S. et al. (Aug. 29, 2023). "Multimodal Biomarkers For Central Nervous Systems Disorders: Development, Validation, and Clinical Integration: Proceedings of a Workshop," National Academies: 1-44, 46 pages.

Cha, S. (Apr. 2006). "CNS Tumors: Monitoring Therapeutic Response and Outcome Prediction," Top Magn Reson Imaging 17(2):63-68.

Mehltretter, J. et al. (Jan. 21, 2020). "Analysis of Features Selected by a Deep Learning Model for Differential Treatment Selection in Depression," Frontier in Artificial Intelligence 2(31):1-13.

* cited by examiner

FIG. 4A

Patient 1: {Feature Set, Response to Treatment X}
Patient 2: {Feature Set, Response to Treatment X}
...
Patient M: {Feature Set, Response to Treatment X}

FIG. 4B

Patient 1: {Feature Set, Overall Response to Treatment X, Response to Symptom 1, Response to Symptom 2, etc.}
Patient 2: {Feature Set, Overall Response to Treatment X, Response to Symptom 1, Response to Symptom 2, etc.}
...
Patient M: {Feature Set, Overall Response to Treatment X, Response to Symptom 1, Response to Symptom 2, etc.}

FIG. 4C

Patient 1: {Feature Set, Response to Treatment X, Side Effect 1, Side Effect 2, etc.}
Patient 2: {Feature Set, Response to Treatment X, Side Effect 1, Side Effect 2, etc.}
...
Patient M: {Feature Set, Response to Treatment X, Side Effect 1, Side Effect 2, etc.}

| Treatment Method Evaluated | Probability of Response | Confidence Interval |
|---|---|---|
| rTMS | 95% | +/- 2% |
| ECT | 58% | +/- 3% |
| Esketamine | 34% | +/- 2% |
| CBT | 15% | +/- 4% |
| SSRI | 23% | +/- 3% |

FIG. 5A

PREDICTING PATIENT RESPONSES TO MULTIPLE MODALITIES OF CNS DISEASE INTERVENTIONS

CROSS-REFERENCE TO RELATED APPLICATION

This application claims the benefit of U.S. Provisional Application 63/575,542 filed on Apr. 5, 2024, the entire content of which is incorporated herein by reference for all purposes.

FIELD OF INVENTION

The present disclosure relates generally to machine-learning techniques, and more specifically to systems (e.g., electroencephalogram (EEG) systems) and methods for predicting responses for a patient diagnosed with a central nervous system (CNS) disease.

BACKGROUND

CNS diseases may be treated using a variety of methods. For example, major depression disorder (MDD) may be treated by medication, transcranial magnetic stimulation (TMS), electroconvulsive therapy (ECT), deep brain stimulation (DBS), cognitive behavioral therapy (CBT), etc. There are also different types of medications for treating MDD, such as selective serotonin reuptake inhibitors (SSRIs) including sertraline, serotonin and norepinephrine reuptake inhibitors (SNRIs), tricyclic antidepressants (TCAs), etc.

However, a treatment generally does not work for all the patients having a specific CNS disease. For example, only 50% of patients typically respond to TMS treatment. Generally, only 30-40% of the patients respond to the first drug prescribed to them. Another 30% of the patients can find a drug that they respond to only after trying several different types of drugs.

Due to the lack of effective biomarkers, clinicians usually cannot determine a priori which treatment modality a particular patient will respond to, leading to lengthy trial-and-error processes, resulting in ineffective treatment, patient suffering, and undue financial burdens for both the patients and the healthcare systems.

BRIEF SUMMARY

Disclosed herein are exemplary devices, apparatuses, systems, methods, and non-transitory storage media for machine-learning techniques for predicting responses for a patient diagnosed with a central nervous system (CNS) disease. An exemplary system (e.g., one or more electronic devices) can receive measurement data collected by a medical device from the patient and extract, from the measurement data, a first set of features and a second set of features. In some embodiments, the measurement data is a set of EEG data collected by an EEG machine, and at least some features from the two sets of features are obtained from the same set of EEG data. In some embodiments, the two sets of features may differ by number of features, feature types, electrode channels, or a combination thereof. In some embodiments, the two sets of features may be identical. The system can input the first set of features into a first treatment-specific machine-learning model to predict a first treatment response by the patient to a first candidate treatment of the CNS disease and input the second set of features into a second treatment-specific machine-learning model to predict a second treatment response by the patient to a second candidate treatment of the CNS disease. The system can then generate a data structure based on the predicted first treatment response to the first candidate treatment of the CNS disease and the predicted second treatment response to the second candidate treatment of the CNS disease and render, on a display, the generated data structure to provide the predicted first treatment response to the first candidate treatment of the CNS disease and the predicted second treatment response to the second candidate treatment of the CNS disease.

In some embodiments, additional information may be needed for some or all of the machine learning models, including demographic information such as age, gender, race; rating scale information, genetic or protein omics information, etc.

Embodiments of the present disclosure provide several technical advantages. For example, embodiments of the present disclosure enable individualized precision medicine for treating CNS diseases and enable clinicians to identify effective treatments for individual patients, thereby shortening treatment time, reducing healthcare cost (e.g., associated with misdiagnosis and ineffective treatments, associated with wasted time for patients and clinicians), reducing patient suffering, and reducing the risk of suicide and the development of comorbidity with rapid and effective treatments. Further, embodiments of the present disclosure can use a single set of baseline measurement data (e.g., a single set of EEG data collected from a patient) and multiple trained machine-learning models to obtain predictions of treatment responses for multiple candidate treatments, thus providing efficient, customized, accurate, and low-cost treatment decision support. Some embodiments of the present disclosure can enable clinicians to choose an optimal treatment based on predicted response, treatment availability, treatment cost, the patient's medical history, or a combination thereof. Furthermore, some embodiments involve the use of a single baseline measurement dataset (e.g., EEG) and use the same baseline measurement dataset to extract features for different machine-learning models relating to different treatment modalities (e.g., trained using different datasets of different patient cohorts) to predict treatment responses for multiple treatment modalities. Thus, some embodiments of the present disclosure improve the functioning of a computer system, as they reduce memory usage and processing power while providing accurate results in an efficient manner.

An exemplary electroencephalography (EEG) system comprises: an EEG device; a display; one or more processors; a memory; and one or more programs, wherein the one or more programs are stored in the memory and configured to be executed by the one or more processors, the one or more programs including instructions for: receiving measurement data collected by a medical device from a patient diagnosed with a central nervous system (CNS) disease; extracting, from the measurement data, a first set of features; extracting, from the measurement data, a second set of features; inputting the first set of features into a first treatment-specific machine-learning model to predict a first treatment response by the patient to a first candidate treatment of the CNS disease, wherein the first treatment-specific machine-learning model is configured to predict patient responses to the first candidate treatment; inputting the second set of features into a second treatment-specific machine-learning model to predict a second treatment response by the patient to a second candidate treatment of the CNS disease, wherein the second treatment-specific machine-learning model is configured to predict patient responses to the second candidate treatment; generating a data structure based on the predicted first treatment response to the first candidate treatment of the CNS disease and the predicted second treatment response to the second candidate treatment of the CNS disease; and rendering, on the display, the generated data structure to provide the predicted first treatment response to the first candidate treatment of the CNS disease and the predicted second treatment response to the second candidate treatment of the CNS disease.

In some embodiments, the one or more programs further include instructions for: inputting one or more prompts into a third machine-learning model to generate a natural-language description of a treatment recommendation or a prognostic analysis, wherein the one or more prompts comprise the predicted first treatment response to the first candidate treatment of the CNS disease and the predicted second treatment response to the second candidate treatment of the CNS disease; and displaying, on the display, the natural-language description of the treatment recommendation or the prognostic analysis. The third machine-learning model may comprise a large language model (LLM). In some embodiments, the measurement data is a set of electroencephalography (EEG) data.

In some embodiments, the first set of features and/or the second set of features comprise: one or more functional connectivity features. The one or more functional connectivity features may comprise one or more power envelope connectivity (PEC) features, one or more features obtained via a generalized eigenvalue deposition (GED) process, one or more entropy connectivity features, one or more mutual information features, one or more coherence features, or any combination thereof.

In some embodiments, the first set of features are obtained using a first set of electrode channels corresponding to a first set of recording sites on the patient's scalp; and the second set of features are obtained using a second set of electrode channels corresponding to a second set of recording sites on the patient's scalp. The first set of electrode channels may be different from or the same as the second set of electrode channels.

In some embodiments, the first or second treatment-specific machine-learning model comprises a supervised model, an unsupervised model, a semi-supervised model, a self-supervised model, an ensemble model, a deep learning model, or any combination thereof. In some embodiments, the predicted first or second treatment response comprises: a probability value, a binary value, an integer, a classification, or any combination thereof.

In some embodiments, the CNS disease comprises: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder, or migraine.

In some embodiments, the first and the second candidate treatments comprise: transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof.

In some embodiments, the one or more programs further include instructions for: adjusting the predicted first treatment response or the predicted second treatment response based on the CNS disease, the first treatment, the second treatment, or any combination thereof. In some embodiments, the first treatment-specific machine-learning model is further configured to predict: a plurality of side effects due to the first treatment, a plurality of responses with respect to a plurality of symptoms associated with the CNS disease, or any combination thereof.

An exemplary machine-learning method for predicting responses for a patient diagnosed with a central nervous system (CNS) disease comprises: receiving measurement data collected by a medical device from the patient; extracting, from the measurement data, a first set of features; extracting, from the measurement data, a second set of features; inputting the first set of features into a first treatment-specific machine-learning model to predict a first treatment response by the patient to a first candidate treatment of the CNS disease, wherein the first treatment-specific machine-learning model is configured to predict patient responses to the first candidate treatment; inputting the second set of features into a second treatment-specific machine-learning model to predict a second treatment response by the patient to a second candidate treatment of the CNS disease, wherein the second treatment-specific machine-learning model is configured to predict patient responses to the second candidate treatment; generating a data structure based on the predicted first treatment response to the first candidate treatment of the CNS disease and the predicted second treatment response to the second candidate treatment of the CNS disease; and rendering, on a display, the generated data structure to provide the predicted first treatment response to the first candidate treatment of the CNS disease and the predicted second treatment response to the second candidate treatment of the CNS disease.

In some embodiments, the method further comprises inputting one or more prompts into a third machine-learning model to generate a natural-language description of a treatment recommendation or a prognostic analysis, wherein the one or more prompts comprise the predicted first treatment response to the first candidate treatment of the CNS disease and the predicted second treatment response to the second candidate treatment of the CNS disease; and displaying, on the display, the natural-language description of the treatment recommendation or the prognostic analysis.

In some embodiments, the third machine-learning model comprises a large language model (LLM). In some embodiments, the measurement data is a set of electroencephalography (EEG) data collected by an EEG device. In some embodiments, the first set of features and/or the second set of features comprise: one or more functional connectivity features. The one or more functional connectivity features may comprise one or more power envelope connectivity (PEC) features, one or more features obtained via a generalized eigenvalue deposition (GED) process, one or more entropy connectivity features, one or more mutual information features, one or more coherence features, or any combination thereof. In some embodiments, the first set of features comprises one or more cross-channel functional connectivity features; and the second set of features comprises one or more cross-channel PEC features.

In some embodiments, the first set of features are obtained using a first set of electrode channels corresponding to a first set of recording sites on the patient's scalp; and the second set of features are obtained using a second set of electrode channels corresponding to a second set of recording sites on the patient's scalp. The first set of electrode channels may be different from or the same as the second set of electrode channels.

In some embodiments, the measurement data is a set of Magnetic Resonance Imaging (MRI) data collected by an MRI machine. The first set of features and/or the second set of features may comprise one or more anatomical metrics of the patient's brain.

In some embodiments, the measurement data is a set of functional magnetic resonance imaging (fMRI) data collected by an fMRI scanner. The first or second treatment-specific machine-learning model may comprise a supervised model, an unsupervised model, a semi-supervised model, a self-supervised model, an ensemble model, a deep learning model, or any combination thereof.

In some embodiments, the predicted first or second treatment response comprises: a probability value, a binary value, an integer, a classification, or any combination thereof.

In some embodiments, the CNS disease comprises: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder or migraine.

In some embodiments, the first and the second candidate treatments comprise: transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof.

In some embodiments, the method further comprises adjusting the predicted first treatment response or the predicted second treatment response based on the CNS disease, the first treatment, the second treatment, or any combination thereof. In some embodiments, the method further comprises the first treatment-specific machine-learning model is further configured to predict: a plurality of side effects due to the first treatment, a plurality of responses with respect to a plurality of symptoms associated with the CNS disease, or any combination thereof.

An exemplary non-transitory computer-readable storage medium storing one or more programs, the one or more programs comprising instructions, which when executed by one or more processors of an electronic device having a display, cause the electronic device to: receive measurement data collected by a medical device from a patient diagnosed with a central nervous system (CNS) disease; extract, from the measurement data, a first set of features; extract, from the measurement data, a second set of features; input the first set of features into a first treatment-specific machine-learning model to predict a first treatment response by the patient to a first candidate treatment of the CNS disease, wherein the first treatment-specific machine-learning model is configured to predict patient responses to the first candidate treatment; input the second set of features into a second treatment-specific machine-learning model to predict a second treatment response by the patient to a second candidate treatment of the CNS disease, wherein the second treatment-specific machine-learning model is configured to predict patient responses to the second candidate treatment; generate a data structure based on the predicted first treatment response to the first candidate treatment of the CNS disease and the predicted second treatment response to the second candidate treatment of the CNS disease; and render, on the display, the generated data structure to provide the predicted first treatment response to the first candidate treatment of the CNS disease and the predicted second treatment response to the second candidate treatment of the CNS disease.

DESCRIPTION OF THE FIGURES

FIGS. 4A-4C illustrate exemplary training datasets, in accordance with some embodiments.

FIG. 5A illustrates an exemplary table for displaying predicted treatment responses, in accordance with some embodiments.

DETAILED DESCRIPTION

Figure 1:
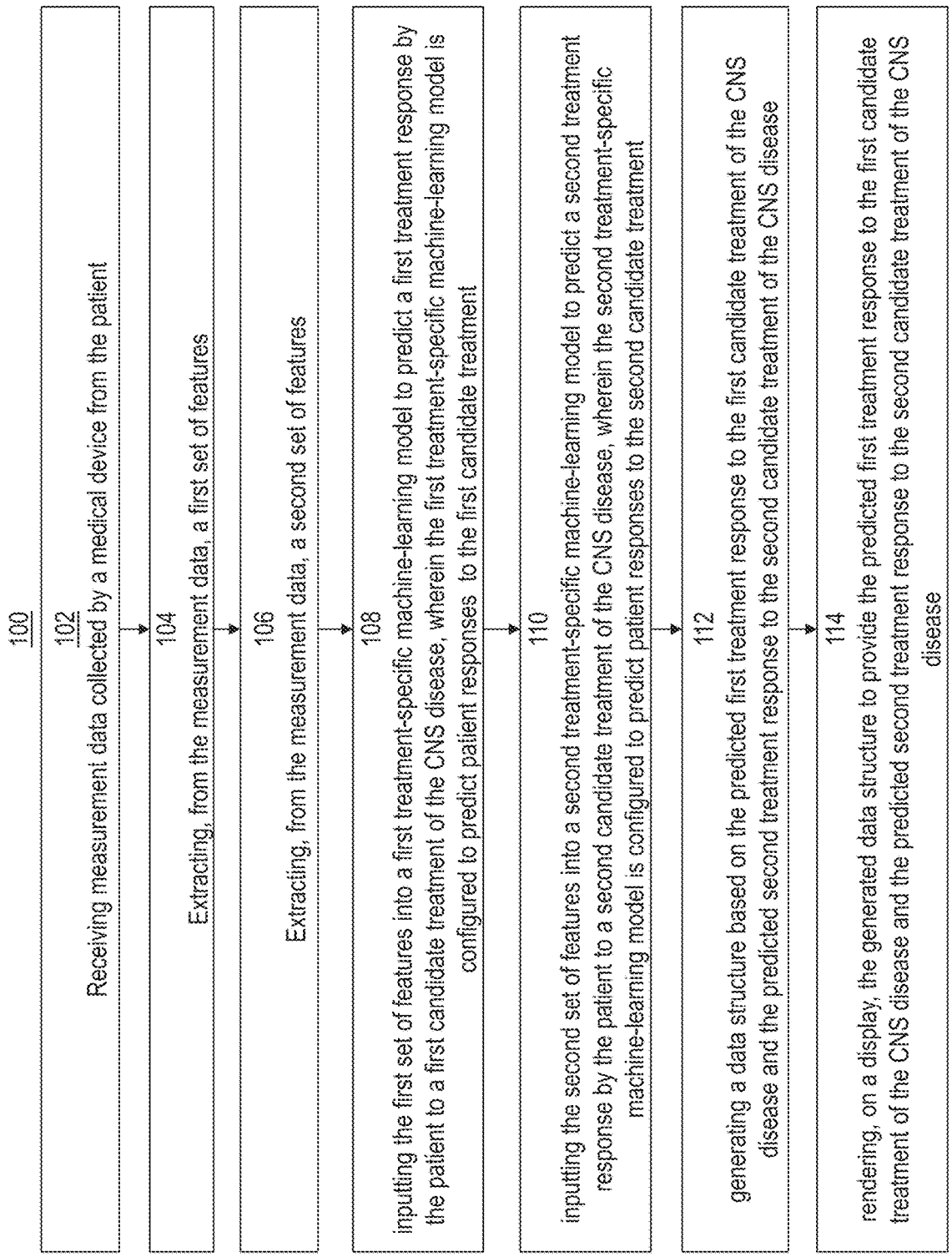
FIG. 1 illustrates an exemplary machine-learning method for predicting responses for a patient diagnosed with a central nervous system (CNS) disease, in accordance with some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Disclosed herein are exemplary devices, apparatuses, systems, methods, and non-transitory storage media for machine-learning techniques for predicting responses for a patient diagnosed with a central nervous system (CNS) disease. An exemplary system (e.g., one or more electronic devices) can receive measurement data collected by a medical device from the patient and extract, from the measurement data, a first set of features and a second set of features. In some embodiments, the measurement data is a set of EEG data collected by an EEG machine, and at least some features from the two sets of features are obtained from the same set of EEG data. In some embodiments, the two sets of features may differ by number of features, feature types, electrode channels, or a combination thereof. In some embodiments, the two sets of features may be identical. The system can input the first set of features into a first treatment-specific machine-learning model to predict a first treatment response by the patient to a first candidate treatment of the CNS disease and input the second set of features into a second treatment-specific machine-learning model to predict a second treatment response by the patient to a second candidate treatment of the CNS disease. The system can then generate a data structure based on the predicted first treatment response to the first candidate treatment of the CNS disease and the predicted second treatment response to the second candidate treatment of the CNS disease and render, on a display, the generated data structure to provide the predicted first treatment response to the first candidate treatment of the CNS disease and the predicted second treatment response to the second candidate treatment of the CNS disease.

In some embodiments, additional information may be needed for some or all of the machine learning models, including demographic information such as age, gender, race; rating scale information, genetic or protein omics information, etc.

Embodiments of the present disclosure provide several technical advantages. For example, embodiments of the present disclosure enable individualized precision medicine for treating CNS diseases and enable clinicians to identify effective treatments for individual patients, thereby shortening treatment time, reducing healthcare cost (e.g., associated with misdiagnosis and ineffective treatments, associated with wasted time for patients and clinicians), reducing patient suffering, and reducing the risk of suicide and the development of comorbidity with rapid and effective treatments. Further, embodiments of the present disclosure can use a single set of baseline measurement data (e.g., a single set of EEG data collected from a patient) and multiple trained machine-learning models to obtain predictions of treatment responses for multiple candidate treatments, thus providing efficient, customized, accurate, and low-cost treatment decision support. Some embodiments of the present disclosure can enable clinicians to choose an optimal treatment based on predicted response, treatment availability, treatment cost, the patient's medical history, or a combination thereof. Furthermore, some embodiments involve the use of a single baseline measurement dataset (e.g., EEG) and use the same baseline measurement dataset to extract features for different machine-learning models relating to different treatment modalities (e.g., trained using different datasets of different patient cohorts) to predict treatment responses for multiple treatment modalities. Thus, some embodiments of the present disclosure improve the functioning of a computer system, as they reduce memory usage and processing power while providing accurate results in an efficient manner.

FIG. 1 illustrates an exemplary machine-learning method for predicting responses for a patient diagnosed with a central nervous system (CNS) disease, in accordance with some embodiments. The CNS disease can include any disorder in which brain or spinal cord function is diminished or impaired, resulting in diminished motor, sensory, or cognitive performance. In some embodiments, the CNS disease can comprise: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder, or migraine.

Process 100 is performed, for example, using one or more electronic devices implementing a software platform. In some embodiments, process 100 is performed using a client-server system, and the blocks of process 100 are divided up in any manner between the server and one or more client devices. Thus, while portions of process 100 are described herein as being performed by particular devices of a client-server system, it will be appreciated that process 100 is not so limited. In other examples, process 100 is performed using only a client device or only multiple client devices. In process 100, some blocks are, optionally, combined, the order of some blocks is, optionally, changed, and some blocks are, optionally, omitted. In some embodiments, additional steps may be performed in combination with the process 100. Accordingly, the operations as illustrated (and described in greater detail below) are exemplary by nature and, as such, should not be viewed as limiting.

At block 102, an exemplary system (e.g., one or more electronic devices) receives measurement data collected by a medical device from the patient. In some embodiments, the medical device is an EEG machine used to record electrical activity in the patient's brain. During an EEG session, a plurality of metal discs (i.e., electrodes) are attached to the patient's scalp (e.g., via adhesives, via an elastic cap fitted with electrodes, etc.). The electrodes are placed at specific locations on the scalp to measure the underlying brain regions. Specifically, at a recording site, a pair of electrodes can be placed, one serving as the recording electrode and the other as the reference electrode, such that the electrical potential difference between these two electrodes can quantify the neural activity occurring at the recording site in the underlying brain tissue. An electrode channel refers to a specific recording site on the scalp and corresponds to a pair of reference electrode and recording electrode. After the electrodes are in place, the EEG machine records electrical signals from various brain regions to collect a set of EEG data. The set of EEG data can be used for feature extraction for different machine-learning models, as discussed below.

In some embodiments, the medical device is a magnetic resonance imaging (MRI) machine used to produce detailed images of internal structures of the patient's brain. During an imaging session, the patient is positioned within the MRI machine, which generates a magnetic field and uses radiofrequency pulses to create detailed images of the brain's internal structures. After the scan is complete, the raw MRI data is processed to obtain cross-sectional images of the brain. The set of MRI images can be used for feature extraction for different machine-learning models, as discussed below.

In some embodiments, the medical device is a functional magnetic resonance imaging (fMRI) scanner used to measure brain activity by detecting changes in blood flow and oxygenation levels in a non-invasive manner. During an imaging session, the fMRI scanner captures images visualizing the brain's activity at various moments. The set of fMRI images can be used for feature extraction for different machine-learning models, as discussed below.

At block 104, the system extracts, from the measurement data, a first set of features. Further, at block 106, the system extracts, from the measurement data, a second set of features. In some embodiments, the measurement data in block 102 is a set of EEG data of the patient, and the first set of features and the second set of features are extracted from the same set of EEG data of the patient. In some embodiments, the measurement data in block 102 is a set of MRI image data of the patient, and the first set of features and the second set of features are extracted from the same set of MRI image data of the patient. In some embodiments, the measurement data in block 102 is a set of fMRI image data of the patient, and the first set of features and the second set of features are extracted from the same set of fMRI image data of the patient. Exemplary features are described below.

In some embodiments, the system receives a set of EEG data from an EEG machine in block 102 and extracts the first set of features and the second set of features from the set of EEG data. The first set of features and/or the second set of features can include one or more functional connectivity features. Functional connectivity features can provide insights into the interactions and relationships between different brain regions. In some embodiments, the EEG functional connectivity features include at least one coherence feature, which measures the consistency of phase differences between EEG signals recorded from different brain regions (e.g., using different electrodes) within a specific frequency range and/or across different frequency ranges. A higher coherence value indicates stronger functional connectivity between brain regions. In some embodiments, the EEG functional connectivity features include at least one mutual information feature. Mutual information quantifies the amount of information shared between EEG signals from different brain regions (e.g., using different electrodes). It can capture dependencies between the signals and provide a measure of their statistical dependence. In some embodiments, the EEG functional connectivity features include at least one power envelope connectivity (PEC) feature. A PEC feature quantifies functional connectivity between different brain regions based on the amplitude fluctuations (i.e., envelops) of EEG signals. PEC features provide insights into the functional interactions between brain regions based on the modulations in their activity levels. In some embodiments, the EEG functional connectivity features include at least one entropy connectivity feature. Entropy connectivity features can quantify temporal patterns of the signals and the information flow between different brain regions to provide a comprehensive picture of brain connectivity.

In some embodiments, the EEG functional connectivity features include at least one feature obtained via a generalized eigenvalue deposition (GED) process. For example, a brain region mutual interaction characteristics (e.g., frequency range power, power-envelope correlation, coherence, weighted phase-lag index, imaginary part of coherence, covariance, mutual information, transfer entropy, and/or variants thereof) can be first analyzed using the EEG data of the patient, which generates a set of brain region mutual interaction feature matrices (MIFMs) for the patient, in which each matrix is for one frequency range of the EEG data. In some embodiments, to extract meaningful information and suppress noise, a further feature enhancement process can be carried out to extract more representative and condensed information from the brain region mutual interaction feature matrices. For example, a generalized eigenvalue decomposition is used to extract the more representative information from brain region mutual interaction feature matrices. For example, a multi-frequency band GED process can be carried out to the set of mutual interaction feature matrices of the patient to extract more prominent mutual interaction features and suppress background noise. Additional details of the GED process can be found in U.S. Pat. No. 11,771,377, the content of which is incorporated herein by reference.

The first set of features extracted in block 104 and the second set of features extracted in block 106 may be different EEG feature sets. In some embodiments, the first set of features and the second set of features may differ by feature type. For example, the first set of features may include coherence features, while the second set of features may include PEC features. In some embodiments, the first set of features and the second set of features may differ by electrode channels. For example, the first set of features may be obtained using a first set of electrode channels of the EEG machine corresponding to a first set of recording sites on the patient's scalp, while the second set of features may be obtained using a second set of electrode channels of the EEG machine corresponding to a second set of recording sites on the patient's scalp (for example, 56 channel model for SSRI drug treatment modality, and 20 channel model for TMS treatment modality). Thus, the first set of features and the second set of features may differ by feature types, electrode channels, or a combination thereof. In some embodiments, the number of electrode channels is larger than or equal to 2.

In some embodiments, the first set of features and the second set of features are identical EEG features. For example, the first set of features and the second set of features can both be obtained using the same subset of electrode channels and involve the same channel-to-channel functional connectivity features. However, the two feature sets are provided to two different machine-learning models, which may have different weights and hyperparameters, as described below.

In some embodiments, the system receives a set of MRI image data from an MRI machine in block 102 and extracts the first set of features and the second set of features from the set of MRI data. The first set of features and/or the second set of features can comprise one or more anatomical metrics of the patient's brain, such as curvature, thickness, volumetric measures, surface area, tissue segmentation, lesions, or the like.

In some embodiments, the system receives a set of fMRI image data from an fMRI scanner in block 102 and extracts the first set of features and the second set of features from the set of fMRI image data. The first set of features and/or the second set of features can comprise statistical correlations between time traces of resting state or task based blood oxygenation level dependent (BOLD) signals measured at different spatially-distinct brain regions.

At block 108, the system inputs the first set of features into a first treatment-specific machine-learning model to predict a first treatment response by the patient to a first candidate treatment of the CNS disease. The first treatment-specific machine-learning model is configured to predict patient responses to the first candidate treatment. The first machine-learning model may be a supervised model, an unsupervised model, a semi-supervised model, a self-supervised model, an ensemble model, a deep learning model, or any combination thereof. For example, the first machine-learning model may be a supervised model such as a random forest model, an XGBoost model, a support vector machine, a deep neural network, a convolutional neural network, a long short-term memory network, a transformer, or the like. For example, the first machine-learning model may be an unsupervised machine-learning model such as K-means, Gaussian Mixture Model (GMM), Balance Iterative Reducing and Clustering using Hierarchies (BIRCH), Affinity Propagation, Density-based Spatial Clustering of Applications with Noise (DBSCAN), and others.

In some embodiments, the first candidate treatment can comprise transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof.

The output of the first machine-learning model can comprise a probability value (e.g., indicative of the probability that the patient will be responsive to the first candidate treatment), a binary value (e.g., yes or no), an integer (e.g., a score indicative of whether the patient is likely to respond to the first candidate treatment), a classification (e.g., high, medium, low), or any combination thereof. In some embodiments, being responsive to the first candidate treatment is defined as a reduction of rating score of the disease over a predefined threshold (e.g., 50%).

At block 110, the system inputs the second set of features into a second treatment-specific machine-learning model. The second treatment-specific machine-learning model is configured to predict patient responses to the second candidate treatment. Accordingly, the second machine-learning model can output a predicted second treatment response by the patient to the second candidate treatment of the CNS disease. The second machine-learning model may be a supervised model, an unsupervised model, a semi-supervised model, a self-supervised model, an ensemble model, a deep learning model, or any combination thereof. For example, the second machine-learning model may be a supervised model such as a random forest model, an XGBoost model, a support vector machine, a deep neural network, a convolutional neural network, a long short-term memory network, a transformer, or the like. For example, the second machine-learning model may be an unsupervised machine-learning model such as K-means, Gaussian Mixture Model (GMM), Balance Iterative Reducing and Clustering using Hierarchies (BIRCH), Affinity Propagation, Density-based Spatial Clustering of Applications with Noise (DBSCAN), and others.

In some embodiments, the second candidate treatment can comprise transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof. The second candidate treatment is different from the first candidate treatment.

The output of the second machine-learning model can comprise a probability value (e.g., indicative of the probability that the patient will be responsive to the second candidate treatment), a binary value (e.g., yes or no), an integer (e.g., a score indicative of whether the patient is likely to respond to the second candidate treatment), a classification (e.g., high, medium, low), or any combination thereof. In some embodiments, being responsive to the second candidate treatment is defined as a reduction of rating score of the disease over a predefined threshold (e.g., 50%).

The first machine-learning model and the second machine-learning model may differ by input features/format, output features/format, model type, architecture, parameter, or any combination thereof. However, both machine-learning models are configured to receive features that are extracted from the same measurement data collected by the same medical device.

In some embodiments, the system provides different machine-learning models for predicting responses to the same treatment for patients diagnosed with different CNS diseases. For example, the system can provide a first machine-learning model for predicting response to a treatment for patients diagnosed with a first CNS disease and provide a second machine-learning model for predicting response to the same treatment for patients diagnosed with a second CNS disease. The two machine-learning models may differ by input features/format, output features/format, model type, architecture, parameter, or any combination thereof. The system can automatically select the appropriate model based on the patient's diagnosis (e.g., which can be obtained based on the medical record or a user input).

At block 112, the system generates a data structure based on the predicted first treatment response to the first candidate treatment of the CNS disease and the predicted second treatment response to the second candidate treatment of the CNS disease. In some embodiments, the data structure comprises a table comprising the predicted first treatment response and the predicted second treatment response. In some embodiments, the data structure comprises a graph visualizing the predicted first treatment response and the predicted second treatment response. In some embodiments, the data structure is generated based on one or more user-specific settings (e.g., the user's preferred method of visualizing data). For example, the system can retrieve a template based on the one or more user-specific settings and update the template based on the predicted first treatment response and the predicted second treatment response to generate the data structure.

In some embodiments, the block 104 is performed by the first machine-learning model, and the block 106 is performed by the second machine-learning model. In other words, the system can provide the same measurement data received in 102 directly to the first machine-learning model and the second machine-learning model. Upon receiving the measurement data, the first machine-learning model can automatically extract the first set of features and process the first set of features further to predict the first treatment response, and the second machine-learning model can automatically extract the second set of features and process the second set of features further to predict the second treatment response. While the input into the first machine-learning model and the second machine-learning model is the same, the two models can be configured to automatically extract different feature sets for further processing to predict the patient's response to different candidate treatments.

At block 114, the system renders, on a display, the generated data structure to provide the predicted first treatment response to the first candidate treatment of the CNS disease and the predicted second treatment response to the second candidate treatment of the CNS disease. Additionally or alternatively, the system can transmit the generated data structure to another device for processing and/or display.

In some embodiments, the system can automatically provide a treatment recommendation or prognostic analysis for the patient based on the predicted first treatment response to the first candidate treatment of the CNS disease and the predicted second treatment response to the second candidate treatment of the CNS disease. For example, the system can compare the predicted treatment responses for multiple candidate treatments and select one or more candidate treatments with the highest predicted treatment responses for recommendation.

In some embodiments, the system can input one or more prompts into a third machine-learning model, such as a large language model (LLM), to generate a natural-language description of a treatment recommendation or a prognostic analysis. The one or more prompts can comprise the predicted first treatment response to the first candidate treatment of the CNS disease and the predicted second treatment response to the second candidate treatment of the CNS disease. For example, the one or more prompts can direct the third machine-learning model to generate a treatment recommendation or a prognostic analysis for the CNS disease given the predicted treatment responses. The system can then display, on a display, the natural-language description of the treatment recommendation or the prognostic analysis or transmit the natural-language description to another device for display.

In some embodiments, the method 100 is performed in response to a diagnosis of the CNS disease. For example, if the system detects that a particular patient is diagnosed with a CNS disease (e.g., via an update to the patient's medical record, via access to the patient's medical record, via a physician's input indicative of the diagnosis), the system can automatically perform the method 100 or output a recommendation to perform the method 100. In some embodiments, the system can prompt a user to specify the patient's diagnosis and candidate treatments for evaluation. In some embodiments, the system can automatically retrieve the patient's diagnosis and candidate treatments from one or more databases.

The method 100 can be performed on one or more electronic devices. In some embodiments, the method 100 can be performed by one or more client devices, one or more server devices, or any combination thereof. For example, a server system can receive information about the patient (e.g., diagnosis, EEG measurement data) from another device (e.g., an EEG machine, a client device) and perform some or all steps of the method 100 to obtain predicted responses. The predicted responses and/or the data structure can be provided to the client device for display. In some embodiments, the method can be performed on a secure client device, such as a secure local device of a healthcare provider. In some embodiments, the method can be performed by a medical device (e.g., an EEG machine, an MRI machine, an fMRI scanner). For example, the machine-learning models can be deployed on an EEG machine such that the analysis can be performed on the EEG machine after the EEG data is obtained.

In some embodiments, the measurement data received at block 102 can be anonymized. In other words, the measurement data excludes any identifiers (e.g., patient information, healthcare provider information, metadata such as location) that may link the data back to the patient. Anonymization of the measurement data may be performed, for example, by removing identifying information (e.g., patient information, healthcare provider information, metadata) from the measurement data. A unique identifier may be added to the measurement data before the measurement data is transmitted. The unique identifier does not, by itself, allow identification of the patient. Anonymization of the measurement data can be performed at the medical device (e.g., EEG machine, MRI scanner) or a client device before the measurement data is transmitted to the devices (e.g., one or more server devices) that perform the process 200. Accordingly, the devices performing the process 200 would not be able to identify the patient from which the measurement data was collected.

After the process 200 is performed, the data structure and/or the predicted responses may be transmitted to another device (e.g., a client device, the medical device that collected the measurement data) for reporting and/or display. The transmitted data may include the unique identifier that was received as part of the measurement data. After receiving the data structure and/or the predicted responses, the client device or the medical device may use the unique identifier to identify the patient (e.g., based on predefined associations between patients and unique identifiers) and include patient information in the data structure for display or for generating a final report.

Figure 2:
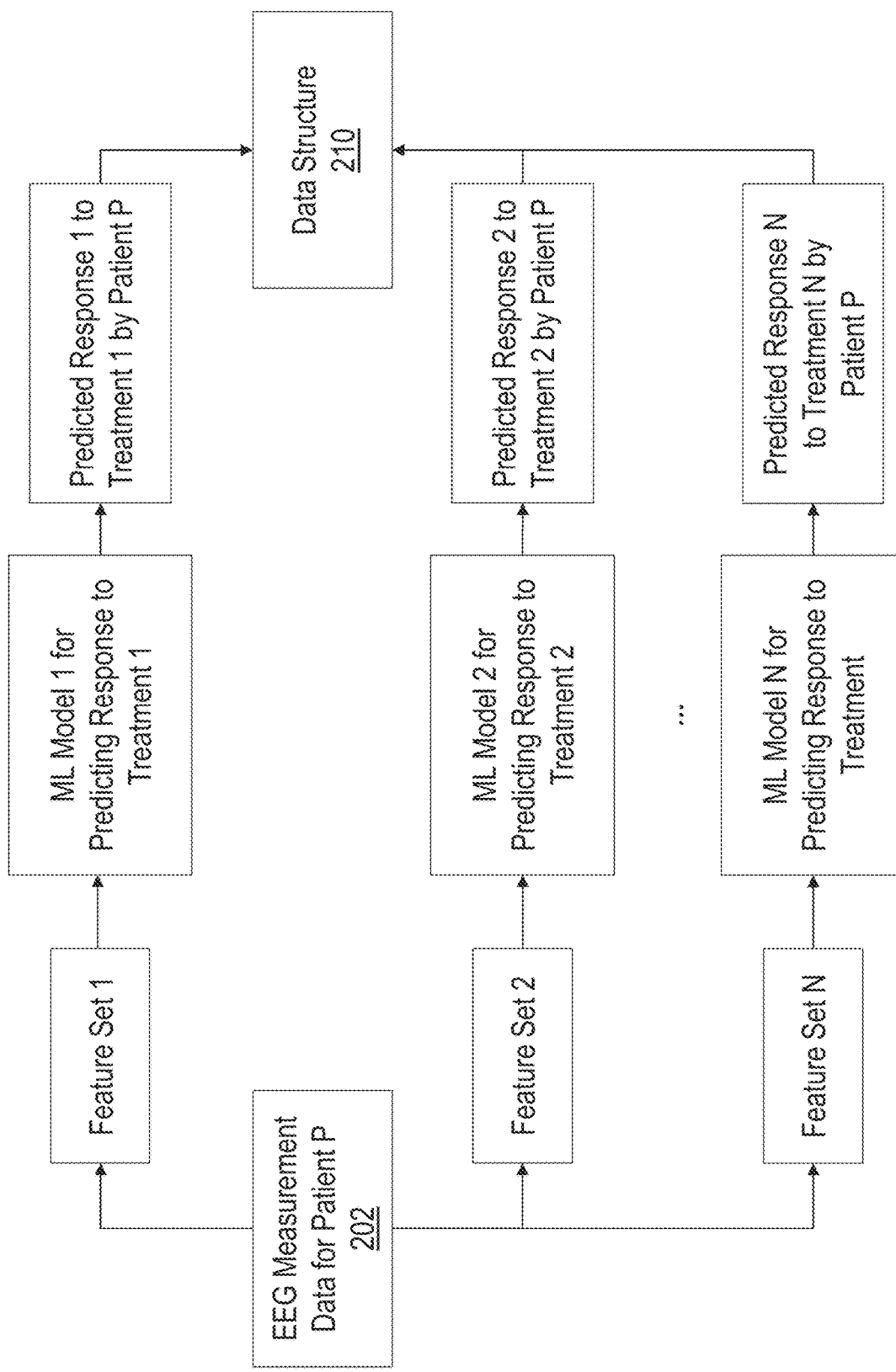
FIG. 2 illustrates an exemplary process for predicting responses for a patient diagnosed with a central nervous system (CNS) disease, in accordance with some embodiments.

FIG. 2 illustrates an exemplary process for predicting responses for a patient diagnosed with a central nervous system (CNS) disease, in accordance with some embodiments. The CNS disease can include any disorder in which brain or spinal cord function is diminished or impaired, resulting in diminished motor, sensory, or cognitive performance. In some embodiments, the CNS disease can comprise: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder, or migraine.

With reference to FIG. 2, an exemplary system (e.g., one or more electronic devices) receives EEG measurement data collected by a medical device from a patient P. However, it should be appreciated that the system may additionally or alternatively receive MRI measurement data collected by an MRI machine or receive fMRI measurement data collected by an fMRI scanner.

Based on the EEG measurement data 202, the system can extract Feature Set 1, Feature Set 2, . . . , and Feature Set N. Notably, all feature sets include one or more features extracted from the same set of EEG measurement data 202. As described herein, Feature Sets 1-N may include one or more functional connectivity features, which can provide insights into the interactions and relationships between different brain regions. As described herein, Feature Sets 1-N may differ by the number of features, the feature types, the originating electrode channels, or any combination thereof.

Further with reference to FIG. 2, the system inputs Feature Set 1 into Model 1 to obtain a predicted response to Treatment 1, Feature Set 2 into Model 2 to obtain a predicted response to Treatment 2, . . . , and Feature Set N into Model N to obtain a predicted response to Treatment N, respectively. Each of Models 1-N may be a supervised model, an unsupervised model, a semi-supervised model, a self-supervised model, an ensemble model, a deep learning model, or any combination thereof. Models 1-N may differ by input features/format, output features/format, model type, architecture, parameter, or any combination thereof. However, all machine-learning models are configured to receive features that are extracted from the same measurement data collected by the same medical device. The output of each machine-learning model can comprise a probability value (e.g., indicative of the probability that the patient will be responsive to the candidate treatment), a binary value (e.g., yes or no), an integer (e.g., a score indicative of whether the patient is likely to respond to the candidate treatment), a classification (e.g., high, medium, low), or any combination thereof.

Based on Predicted Responses 1-N, the system generates a data structure 210. In some embodiments, the data structure comprises a table comprising the predicted treatment responses. In some embodiments, the data structure comprises a graph visualizing the predicted first treatment response and the predicted second treatment response. In some embodiments, the data structure is generated based on one or more user-specific settings (e.g., the user's preferred method of visualizing data). For example, the system can retrieve a template based on the one or more user-specific settings and update the template based on the predicted first treatment response and the predicted second treatment response to generate the data structure. The system can render the generated data structure on a display or transmit to another device for display.

Accordingly, the system can include different machine-learning models for predicting patient responses to different candidate treatments. In an exemplary implementation, Patient P is diagnosed with MDD. The system can include multiple machine-learning models for predicting patient responses to different treatments of MDD. The MDD can be associated with different treatments such as medication (e.g., selective serotonin reuptake inhibitors or SSRIs), transcranial magnetic stimulation (TMS), electroconvulsive therapy (ECT), deep brain stimulation (DBS), cognitive behavioral therapy (CBT), etc. Treatment 1 may be SSRI and Model 1 is configured to generate a predicted response to SSRI, and Treatment 2 may be TMS and Model 2 is configured to generate a predicted response to TMS. The models may be trained using different datasets of different patient cohorts (e.g., patient cohort previously treated with SSRI v. patient cohort previously treated with TMS).

Figure 3:
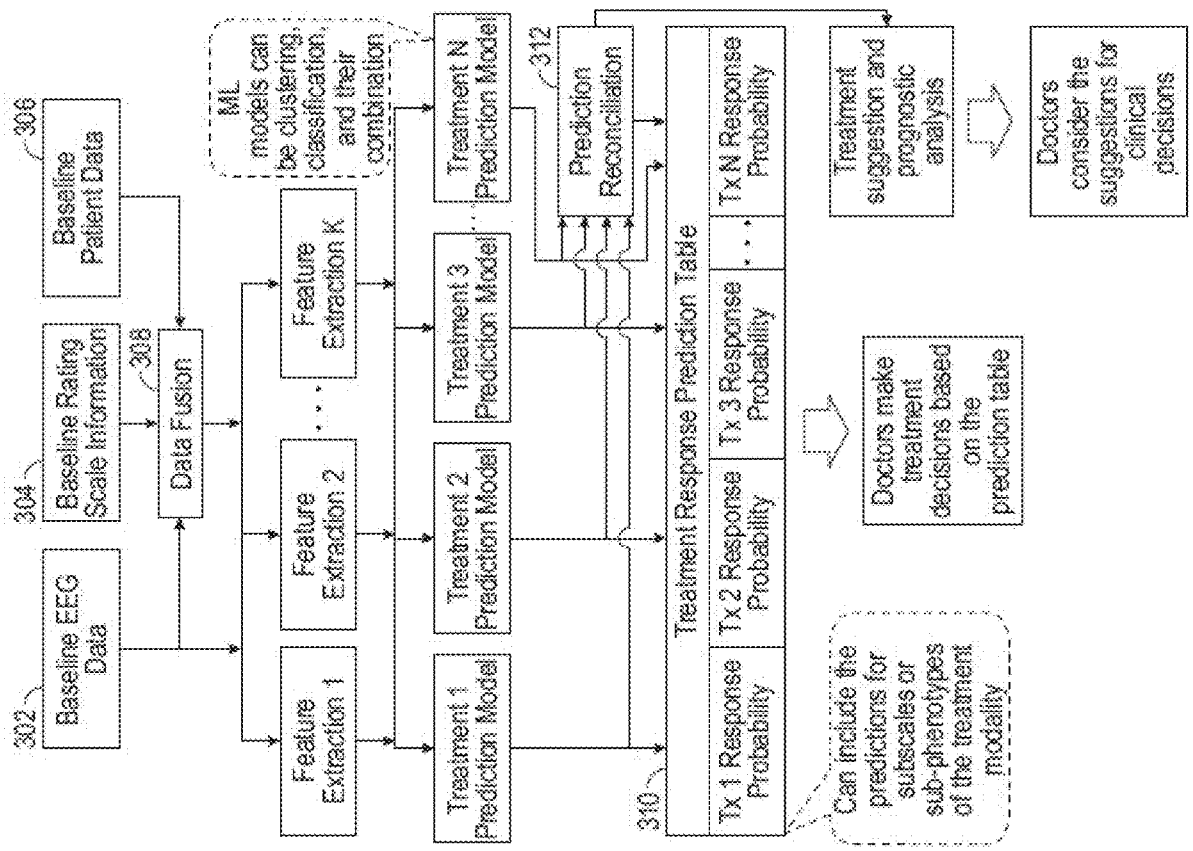
FIG. 3 illustrates an exemplary process for predicting responses for a patient diagnosed with a central nervous system (CNS) disease, in accordance with some embodiments.

FIG. 3 illustrates an exemplary process for predicting responses for a patient diagnosed with a central nervous system (CNS) disease, in accordance with some embodiments. In FIG. 3, an exemplary system receives baseline EEG data 302, which may be the same as the EEG measurement data 202 in FIG. 2. Optionally, the system also receives baseline rating scale information 304 and/or baseline patient data 306. The baseline rating scale information 304 can include disease-specific rating scales that evaluate the severity and progression of symptoms associated with the patient's CNS disease diagnosis. The baseline patient data 306 can include information specific to the patient, such as the patient's demographic information, medical history, omics data, etc.

With reference to FIG. 3, the system comprises an optional data fusion module 308. The data fusion module 308 can combine the EEG measurement data 202, the baseline rating scale information 304, and/or baseline patient data 306 to capture complementary information to improve downstream feature extraction and predictive models. The rating scale information 304 comprises the total score of a rating scale, a full set of itemized scores, a subset of itemized scores. Baseline patient data 306 comprises patient demographic information, including age, gender, race. Baseline patient data 306 also comprises clinical data such as age of onset, genomic data, proteomic data, metabolomic data. Data fusion module 308 combines diverse types of data, including EEG measurement data, baseline rating scale data and baseline patient data, for example, by format unification and data scale normalization. Data fusion module 308 can also comprise dimension reduction algorithms (e.g., Principal Component Analysis (PCA)) to reduce the number of input variables or features.

The EEG measurement data 202 and the outputs of the data fusion model 308 are provided to feature extraction modules 1-K. Each feature extraction module is configured to extract one or more features based on the EEG measurement data 202 and/or the outputs of the data fusion model 308. Based on the extracted features, the system can generate N feature sets. A feature extracted by a feature extraction module may be used in one, some, or all of the N feature sets. The N feature sets are provided to N treatment prediction models corresponding to N candidate treatments, respectively, to generate N predicted responses. The N predicted responses are used to generate a data structure 310, which is a table in the depicted example.

The system can further comprise an optional prediction reconciliation module 312, which receives some or all of the predicted responses from the prediction models and generate treatment recommendations and/or a prognostic analysis. In some embodiments, the prediction reconciliation module 312 comprises a machine learning model, such as an LLM. The prediction reconciliation module 312 can input one or more prompts into the machine-learning model to generate a natural-language description of a treatment recommendation or a prognostic analysis. The one or more prompts can comprise the predicted treatment responses. For example, the one or more prompts can direct the machine-learning model to generate a treatment recommendation or a prognostic analysis for the CNS disease given the predicted treatment responses.

In some embodiments, the optional prediction reconciliation module 312 is configured to receive the predicted treatment responses and information about the candidate treatments to generate a treatment plan that prioritizes certain candidate treatments. The information can include availability of one or more candidate treatments, cost of one or more candidate treatments, symptoms targeted by one or more candidate treatments, regimen of one or more treatments, latest literature/FDA guidelines related to the one or more treatments, etc. The information can be retrieved from one or more databases (e.g., by a server device) and be continuously or periodically updated and the model can be re-trained iteratively. In some embodiments, the prediction reconciliation module 312 can further receive information about the patient such as baseline patient data 306. The prediction reconciliation module 312 can generate a treatment plan that includes a subset of the candidate treatments or includes a prioritized list of candidate treatments. In some embodiments, the prediction reconciliation module can include a machine-learning model (e.g., an LLM model) for generating the treatment plan or prioritized list of candidate treatments. In some embodiments, the prediction reconciliation module 312 can be triggered when the predicted treatment responses or the number of candidate treatments meets a predefined threshold. For example, if the system determines that that the number of candidate treatments exceeds a predefined threshold and/or if the predicted responses do not indicate a clear candidate treatment to select (e.g., if the standard deviation is below a predefined threshold).

In some embodiments, the system can generate predicted symptom-specific responses to one or more specific symptoms associated with the CNS disease with respect to a given candidate treatment. For example, a CNS disease may be associated with multiple symptoms such as depressed mood, suicide, insomnia, psychic anxiety, weight loss, etc. For each symptom, the system can generate a predicted response (i.e., impact or improvement to the symptom) if the patient receives a specific candidate treatment. Each symptom-specific prediction can be a probability value (e.g., indicative of the probability that the symptom will improve responsive to the candidate treatment), a binary value (e.g., indicative of whether the symptom will improve responsive to the candidate treatment), an integer (e.g., a score indicative of whether the symptom is likely to improve responsive to the candidate treatment), a classification (e.g., high, medium, low), or any combination thereof. The symptom-specific response predictions can be generated by the same prediction model for predicting the overall treatment response for a given candidate treatment, or by additional models of the system. For example, in FIG. 2, Model 1 can be configured to additionally output a plurality of predictions, each prediction indicative of impact of Treatment 1 to a symptom of the CNS disease.

In some embodiments, the system can generate predicted side effects with respect to a given candidate treatment. For example, a treatment may be associated with multiple possible side effects such as sedation or drowsiness, dizziness, cognitive impairment, gastrointestinal disturbances, etc. Thus, the system can generate an output for each possible side effects of a given candidate treatment. Each side-effect-specific prediction can be a probability value (e.g., indicative of the probability that the side effect will occur responsive to the candidate treatment), a binary value (e.g., indicative of whether the side effect will occur responsive to the candidate treatment), an integer (e.g., a score indicative of whether the side effect is likely to occur responsive to the candidate treatment), a classification (e.g., high, medium, low), or any combination thereof. The side-effect-specific predictions can be generated by the same prediction model for predicting the overall treatment response for a given candidate treatment, or by additional models of the system. For example, in FIG. 2, Model 1 can be configured to additionally output a plurality of predictions, each prediction indicative of possibility of a side effect responsive to taking Treatment 1.

FIGS. 4A-4C illustrate exemplary training datasets, in accordance with some embodiments. FIG. 4A illustrates an exemplary training dataset for training a model for predicting a patient's response to treatment X. The training dataset includes historical data related to a cohort of patients, specifically, a feature set of each patient in the cohort and the corresponding response to treatment X. FIG. 4B illustrates an exemplary training dataset for training a model for predicting a patient's response to treatment X, as well as symptom-specific response predictions. The training dataset includes historical data related to a cohort of patients, specifically, a feature set of each patient in the cohort, the corresponding overall response of each patient to treatment X, and the corresponding symptom-specific responses of each patient to treatment X. FIG. 4C illustrates an exemplary training dataset for training a model for predicting a patient's response to treatment X, as well as side effect predictions. The training dataset includes historical data related to a cohort of patients, specifically, a feature set of each patient in the cohort, the corresponding response of each patient to treatment X, and the corresponding side effects of each patient to treatment X. The training datasets can be updated based on new patient data, and any model described herein can be retrained iteratively based on updated training datasets. As discussed above, each prediction model described herein can be treatment-specific and disease-specific and the training data is obtained from a patient cohort that has been diagnosed with the corresponding disease and treated with the corresponding treatment.

FIG. 5A illustrates an exemplary table for displaying predicted treatment responses, in accordance with some embodiments. In the depicted example, the table includes a predicted response for each of four candidate treatments to a given CNS disease, including SSRI, rTMS, ECT, CBT, and Esketamine. For each prediction, a confidence interval may be provided to indicate the confidence level associated with the prediction. Based on the table, a physician can identify a treatment (e.g., rTMS) accordingly.

Figure 5B:
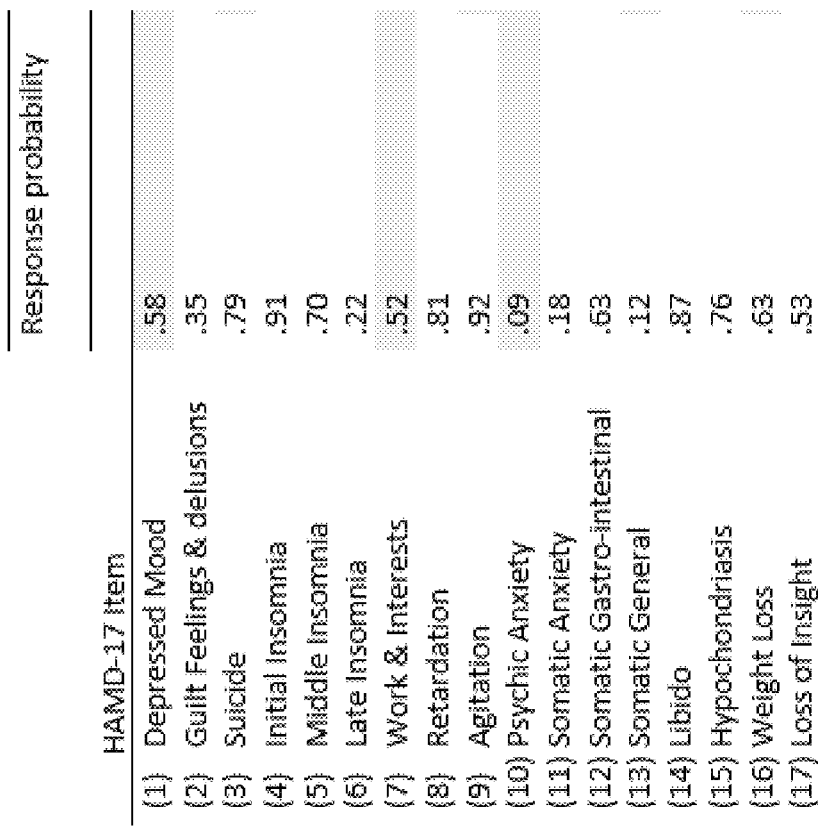
FIG. 5B illustrates an exemplary table for displaying predicted symptom-specific treatment responses, in accordance with some embodiments.

FIG. 5B illustrates an exemplary table for displaying predicted symptom-specific treatment responses, in accordance with some embodiments. In the depicted example, the table includes a probability of a candidate treatment can address each symptom of a CNS disease.

Figure 6:
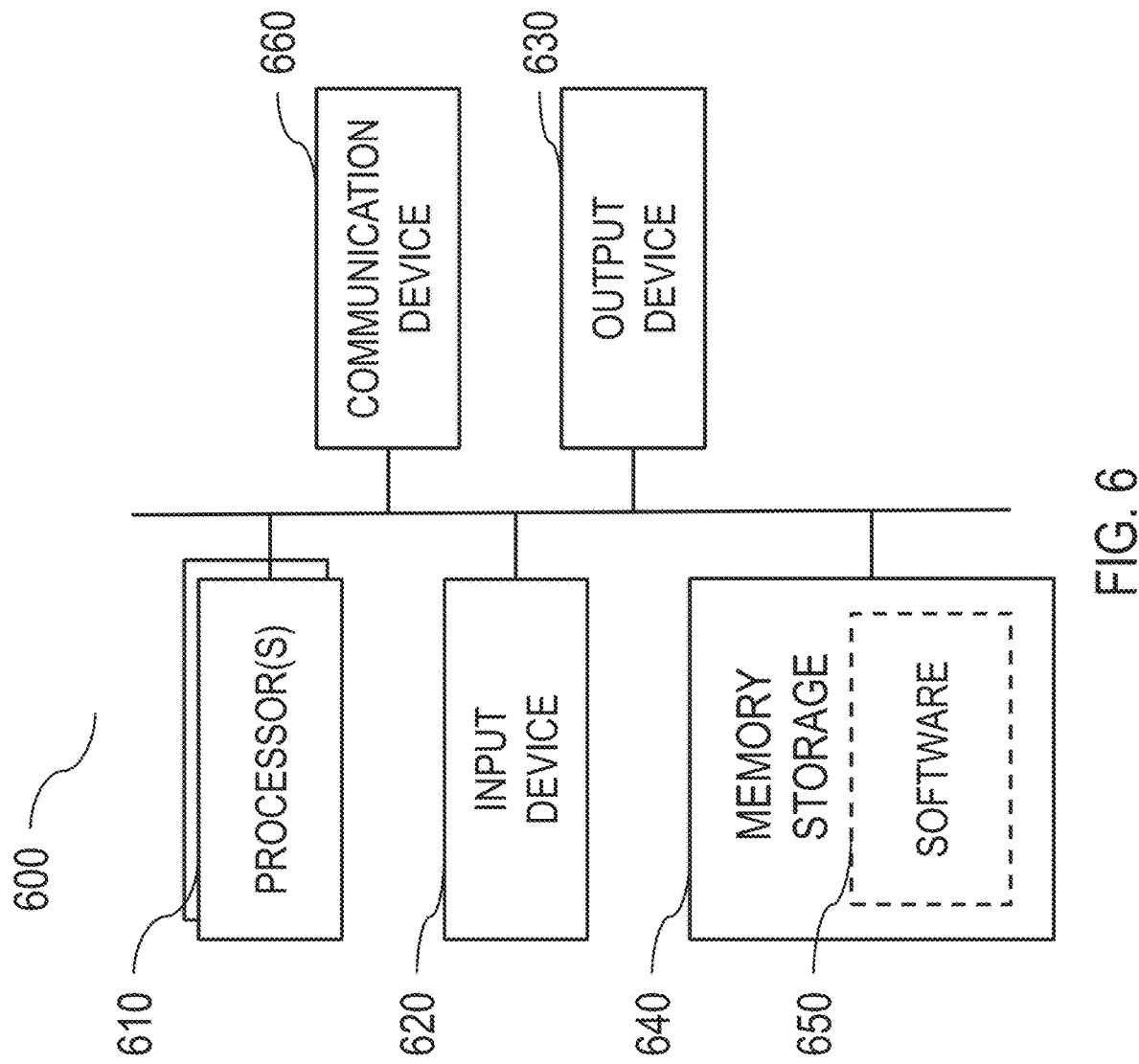
FIG. 6 illustrates an example of a computing device in accordance with one embodiment.

The operations described above are optionally implemented by components depicted in FIG. 6. It would be clear to a person having ordinary skill in the art how other processes are implemented based on the components depicted in FIG. 6.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server or handheld computing device (portable electronic device) such as a phone or tablet. The device can include, for example, one or more of processor 610, input device 620, output device 630, storage 640, and communication device 660. Input device 620 and output device 630 can generally correspond to those described above, and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic or optical memory including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples or aspects. However, the illustrative discussions above are not intended to be exhaustive or to limit the invention to the precise forms disclosed. For the purpose of clarity and a concise description, features are described herein as part of the same or separate variations; however, it will be appreciated that the scope of the disclosure includes variations having combinations of all or some of the features described. Many modifications and variations are possible in view of the above teachings. The variations were chosen and described in order to best explain the principles of the techniques and their practical applications. Others skilled in the art are thereby enabled to best utilize the techniques and various variations with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. An electroencephalography (EEG) system comprising:
an EEG device;
a display;
one or more processors;
a memory; and
one or more programs, wherein the one or more programs are stored in the memory and configured to be executed by the one or more processors, the one or more programs including instructions for:
receiving measurement data collected by a medical device from a patient diagnosed with a central nervous system (CNS) disease, wherein the measurement data comprises EEG data;
extracting, from the measurement data, a first set of features obtained using a first set of electrode channels corresponding to a first set of recording sites on the patient's scalp, wherein the first set of recording sites are selected based on a first candidate treatment of the CNS disease;
extracting, from the measurement data, a second set of features obtained using a second set of electrode channels corresponding to a second set of recording sites on the patient's scalp, wherein the second set of recording sites are selected based on a second candidate treatment of the CNS disease and are different from the first set of recording sites;
inputting the first set of features into a first treatment-specific machine-learning model to predict a first treatment response by the patient to the first candidate treatment of the CNS disease, wherein the first treatment-specific machine-learning model is configured to predict patient responses to the first candidate treatment;
inputting the second set of features into a second treatment-specific machine-learning model to predict a second treatment response by the patient to the second candidate treatment of the CNS disease, wherein the second treatment-specific machine-learning model is configured to predict patient responses to the second candidate treatment;
generating a data structure based on the predicted first treatment response to the first candidate treatment of the CNS disease and the predicted second treatment response to the second candidate treatment of the CNS disease; and
rendering, on the display, the generated data structure to provide the predicted first treatment response to the first candidate treatment of the CNS disease and the predicted second treatment response to the second candidate treatment of the CNS disease.

2. The EEG system of claim 1, wherein the one or more programs further include instructions for:
inputting one or more prompts comprising the predicted first treatment response to the first candidate treatment of the CNS disease from the first machine-learning model, the predicted second treatment response to the second candidate treatment of the CNS disease from the second machine-learning model, and information about the first candidate treatment and the second candidate treatment into a third machine-learning model to generate a natural-language description of a treatment recommendation or a prognostic analysis including a prioritization of the first or the second candidate treatment based on the one or more prompts;
displaying, on the display, the natural-language description of the treatment recommendation or the prognostic analysis.

3. The EEG system of claim 2, wherein the third machine-learning model comprises a large language model (LLM).

4. The EEG system of claim 1, wherein the first set of features and/or the second set of features comprise: one or more functional connectivity features.

5. The EEG system of claim 4, wherein the one or more functional connectivity features comprise one or more power envelope connectivity (PEC) features, one or more features obtained via a generalized eigenvalue deposition (GED) process, one or more entropy connectivity features, one or more mutual information features, one or more coherence features, or any combination thereof.

6. The EEG system of claim 1, wherein the first or second treatment-specific machine-learning model comprises a supervised model, an unsupervised model, a semi-supervised model, a self-supervised model, an ensemble model, a deep learning model, or any combination thereof.

7. The EEG system of claim 1, wherein the predicted first or second treatment response comprises: a probability value, a binary value, an integer, a classification, or any combination thereof.

8. The EEG system of claim 1, wherein the CNS disease comprises: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder, or migraine.

9. The EEG system of claim 1, wherein the first and the second candidate treatments comprise: transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof.

10. The EEG system of claim 1, wherein the one or more programs further include instructions for:

adjusting the predicted first treatment response or the predicted second treatment response based on the CNS disease, the first treatment, the second treatment, or any combination thereof.

11. The EEG system of claim 1, wherein the first treatment-specific machine-learning model is further configured to predict:
 a plurality of side effects due to the first treatment,
 a plurality of responses with respect to a plurality of symptoms associated with the CNS disease, or
 any combination thereof.

12. A machine-learning method for predicting responses for a patient diagnosed with a central nervous system (CNS) disease, comprising:
 receiving measurement data collected by a medical device from the patient, wherein the measurement data comprises EEG data;
 extracting, from the measurement data, a first set of features obtained using a first set of electrode channels corresponding to a first set of recording sites on the patient's scalp, wherein the first set of recording sites are selected based on a first candidate treatment of the CNS disease;
 extracting, from the measurement data, a second set of features obtained using a second set of electrode channels corresponding to a second set of recording sites on the patient's scalp, wherein the second set of recording sites are selected based on a second candidate treatment of the CNS disease;
 inputting the first set of features into a first treatment-specific machine-learning model to predict a first treatment response by the patient to the first candidate treatment of the CNS disease, wherein the first treatment-specific machine-learning model is configured to predict patient responses to the first candidate treatment;
 inputting the second set of features into a second treatment-specific machine-learning model to predict the second treatment response by the patient to a second candidate treatment of the CNS disease, wherein the second treatment-specific machine-learning model is configured to predict patient responses to the second candidate treatment;
 generating a data structure based on the predicted first treatment response to the first candidate treatment of the CNS disease and the predicted second treatment response to the second candidate treatment of the CNS disease; and
 rendering, on a display, the generated data structure to provide the predicted first treatment response to the first candidate treatment of the CNS disease and the predicted second treatment response to the second candidate treatment of the CNS disease.

13. The method of claim 12, further comprising:
 inputting one or more prompts comprising the predicted first treatment response to the first candidate treatment of the CNS disease from the first machine-learning model, the predicted second treatment response to the second candidate treatment of the CNS disease from the second machine-learning model, and information about the first candidate treatment and the second candidate treatment into a third machine-learning model to generate a natural-language description of a treatment recommendation or a prognostic analysis including a prioritization of the first or the second candidate treatment based on the one or more prompts;
 displaying, on the display, the natural-language description of the treatment recommendation or the prognostic analysis.

14. The method of claim 13, wherein the third machine-learning model comprises a large language model (LLM).

15. The method of claim 13, wherein the measurement data is a set of electroencephalography (EEG) data collected by an EEG device and wherein the first set of features and/or the second set of features comprise: one or more functional connectivity features.

16. The method of claim 15, wherein the one or more functional connectivity features comprise one or more power envelope connectivity (PEC) features, one or more features obtained via a generalized eigenvalue deposition (GED) process, one or more entropy connectivity features, one or more mutual information features, one or more coherence features, or any combination thereof.

17. The method of claim 12, wherein the measurement data is a set of Magnetic Resonance Imaging (MRI) data collected by an MRI machine or a set of functional magnetic resonance imaging (fMRI) data collected by an fMRI scanner.

18. The method of claim 17, wherein the first set of features and/or the second set of features comprise one or more anatomical metrics of the patient's brain.

19. The method of claim 12, wherein the first or second treatment-specific machine-learning model comprises a supervised model, an unsupervised model, a semi-supervised model, a self-supervised model, an ensemble model, a deep learning model, or any combination thereof.

20. The method of claim 12, wherein the predicted first or second treatment response comprises: a probability value, a binary value, an integer, a classification, or any combination thereof.

21. The method of claim 12, wherein the CNS disease comprises: major depression disorder (MDD), general anxiety disorder (GAD), bipolar disorder, schizophrenia disorder, treatment resistant depression (TRD), autism, ADHD, Alzheimer's Disease, Parkinson's Disease, epilepsy, alcoholism, substance addiction, sleep disorder, or migraine.

22. The method of claim 12, wherein the first and the second candidate treatments comprise: transcranial magnetic stimulation (TMS), electroconvulsive therapy (ECT), deep brain stimulation (DBS), cognitive behavioral therapy (CBT), selective serotonin reuptake inhibitors (SSRIs), serotonin and norepinephrine reuptake inhibitors (SNRIs), tricyclic antidepressants (TCAs), vagus nerve stimulation (VNS), tACS, tDCS, EsKetamine, psychedelic, or any combination thereof.

23. The method of claim 12, further comprising:
 adjusting the predicted first treatment response or the predicted second treatment response based on the CNS disease, the first treatment, the second treatment, or any combination thereof.

24. The method of claim 12, wherein the first treatment-specific machine-learning model is further configured to predict:
 a plurality of side effects due to the first treatment,
 a plurality of responses with respect to a plurality of symptoms associated with the CNS disease, or
 any combination thereof.

25. A non-transitory computer-readable storage medium storing one or more programs, the one or more programs comprising instructions, which when executed by one or more processors of an electronic device having a display, cause the electronic device to:

receive measurement data collected by a medical device from a patient diagnosed with a central nervous system (CNS) disease, wherein the measurement data comprises EEG data;

extract, from the measurement data, a first set of features obtained using a first set of electrode channels corresponding to a first set of recording sites on the patient's scalp, wherein the first set of recording sites are selected based on a first candidate treatment of the CNS disease;

extract, from the measurement data, a second set of features obtained using a second set of electrode channels corresponding to a second set of recording sites on the patient's scalp, wherein the second set of recording sites are selected based on a second candidate treatment of the CNS disease and are different from the first set of recording sites;

input the first set of features into a first treatment-specific machine-learning model to predict a first treatment response by the patient to the first candidate treatment of the CNS disease, wherein the first treatment-specific machine-learning model is configured to predict patient responses to the first candidate treatment;

input the second set of features into a second treatment-specific machine-learning model to predict a second treatment response by the patient to the second candidate treatment of the CNS disease, wherein the second treatment-specific machine-learning model is configured to predict patient responses to the second candidate treatment;

generate a data structure based on the predicted first treatment response to the first candidate treatment of the CNS disease and the predicted second treatment response to the second candidate treatment of the CNS disease; and render, on the display, the generated data structure to provide the predicted first treatment response to the first candidate treatment of the CNS disease and the predicted second treatment response to the second candidate treatment of the CNS disease.

26. The EEG system of claim 1, wherein the first set of features include one or more power envelope connectivity (PEC) features, entropy features, or coherence features, and wherein the second set of features is different from the first set of features by excluding at least one of the one or more PEC features, entropy features, or coherence features.

* * * * *